United States Patent [19]
Shurtleff

[11] Patent Number: 5,188,742
[45] Date of Patent: Feb. 23, 1993

[54] APPARATUS AND METHOD FOR REMOVING CONTAMINANTS FROM WATER

[76] Inventor: Edward C. Shurtleff, R.R. #1, St. George, N.B., Canada, E0G 2L0

[21] Appl. No.: 712,758

[22] Filed: Jun. 10, 1991

[51] Int. Cl.⁵ .......................................... B01D 35/18
[52] U.S. Cl. .................................. 210/774; 210/175; 210/180
[58] Field of Search ...................... 210/774, 195.1, 259, 210/104, 121, 175, 180; 122/160; 110/258, 236, 199, 201

[56] References Cited

U.S. PATENT DOCUMENTS

| | | | |
|---|---|---|---|
| 568,550 | 9/1896 | Thorpe | 210/175 |
| 3,306,236 | 2/1967 | Campbell | 210/774 |
| 3,557,722 | 1/1971 | Erman | 110/236 |
| 4,044,696 | 8/1977 | Marincek | 210/774 |
| 4,758,335 | 7/1988 | Hayden | 210/195.1 |
| 5,020,452 | 6/1991 | Rybak | 110/258 |

FOREIGN PATENT DOCUMENTS

| | | | |
|---|---|---|---|
| 960576 | 1/1975 | Canada | 210/774 |
| 0052487 | 4/1977 | Japan | 210/774 |
| 1502043 | 8/1989 | U.S.S.R. | 210/175 |

Primary Examiner—Robert A. Dawson
Assistant Examiner—Ana M. Fortuna
Attorney, Agent, or Firm—Bereskin & Parr

[57] ABSTRACT

The apparatus has a vaporization vessel and a combustion chamber including a burner. Contaminated water is supplied to the vessel, and vaporized. Simultaneously, any oil-based contaminants in the water are combusted or consumed, with excess air being supplied for this purpose. The water vapour and combustion products exit the chamber and may be condensed to recover the water. The recovered water contains a sufficiently low concentration of oil-based contaminants that it may be discharged.

19 Claims, 4 Drawing Sheets

APPARATUS AND METHOD FOR REMOVING CONTAMINANTS FROM WATER

FIELD OF INVENTION

This invention relates generally to an apparatus and method for recovering or removing contaminants, such as waste oil or the like, from water. And more particularly relates to method and apparatus for separating oil or the like from water where the oil is present only as a trace amount relative to the amount of water.

BACKGROUND OF THE INVENTION

There are numerous industrial activities where large amounts of water become contaminated to a slight extent by oil or oil-based substances. For example, water used as ballast in the holds of oil tankers gives substantial quantities of oil contaminated water. Oil can also be present in bilge water from a ship. In many cases, the degree of contamination is slight, but the volumes of water involved are large. In view of the fact that oil and the like have a severe effect on the environment, disposal of such contaminated water poses a considerable problem. It is unacceptable to simply dispose of such contaminated water into rivers or other water courses. Further, in view of the present increasing awareness of the damage that various pollutants can do to the environment, in various jurisdictions the regulations etc. governing disposal of contaminated water are becoming stricter.

One known disposal technique is to pass the water through water/oil separators. In many cases, these consist simply of tanks with a series of baffles. They are based on the principle that oil and like substances float on the surface of water. Thus, by causing the water to flow under a series of baffles, the oil and other substances with a retarded or retained behind the baffles. The intention is that after the water has passed under a series of baffles, then it should be relatively clean. However, in many cases this technique is less than effective, and it does not reduce the oil content below that required. In particular, in the case of oils emulsified in water, this technique is ineffective. Further, where a mixture of oils is involved, there is usually at least one oil having a density close to that of water, preventing it from being separated by such a technique. In any event, such a technique requires the large volumes of water involved to be collected and transported to an installation with the baffled tanks, etc.

Other techniques include the use of membranes, to separate the oil from the water, but these have the disadvantage that they tend to clog quickly.

Another technique is to use filters, but this is ineffective where the oil has a similar molecular size to that of water.

A further technique is to use a settling tank, but this again relies upon the fact that the contaminants will float or otherwise separate from the water, which is not always the case.

All the foregoing techniques involve relatively large scale and expensive installations. As a consequence, the water has to be collected and transported to the installation for processing. This adds to the cost. At the present time, in Canada, it can cost Cdn. $1.00 per gallon to dispose of contaminated water. Since many marine operations and the like generate contaminated water in quantities of millions of gallons, the costs involved in disposal are considerable.

It is therefore desirable to provide some disposal technique for oil-contaminated water, which reduces the oil content well below any level required by regulation, etc., which is simple and economical, and which preferably does not require any large, complex or expensive equipment. It is desirable that the method can be carried out in a simple and economic apparatus, so that it becomes feasible to supply such equipment or apparatus to a location where any significant quantity of contaminated oil is collected, e.g. individual ports, docks, etc.

SUMMARY OF THE PRESENT INVENTION

In accordance with the present invention, there is provided an apparatus for removing contaminants from water, the apparatus comprising:

a chamber, including means for supplying combustion air to the chamber and an exhaust outlet;

heating means comprising a burner having air and fuel supply inlets, located within the chamber to heat the interior of the chamber to a temperature sufficient to vaporize water and cause combustion of such oil-based contaminants;

an evaporation vessel located above the chamber, which chamber includes an inlet for contaminated water, and is arranged to discharge water vapour and vaporized contaminants into the combustion chamber; and means for supplying contaminated water to the inlet of the evaporation vessel.

The present invention also provides a method of removing contaminants from water, the method comprising:

(1) heating water to evaporate the water and vaporize any contaminants therein;

(2) supplying fuel and combustion air to the chamber;

(3) heating a chamber to a temperature sufficient to vaporize water and cause combustion of such contaminants;

(4) supplying vaporized water and contaminants to the chamber, whereby any residual water and any contaminants are water is vaporized and any contaminants therein are combusted, the water vapour and combustion products being exhausted through an exhaust outlet of the chamber. Thus, the water is pre-heated and the resultant water vapour and vaporised contaminants are then injected together into a combustion region of the chamber, whereby any contaminants are immediately combusted.

BRIEF DISCUSSION OF THE DRAWING FIGURES

For a better understanding of the present invention, and to show more clearly how it may be carried into effect, reference will now be made, by way of example, to the accompanying drawings, in which.

DESCRIPTION OF THE PREFERRED EMBODIMENT

Figure 1:
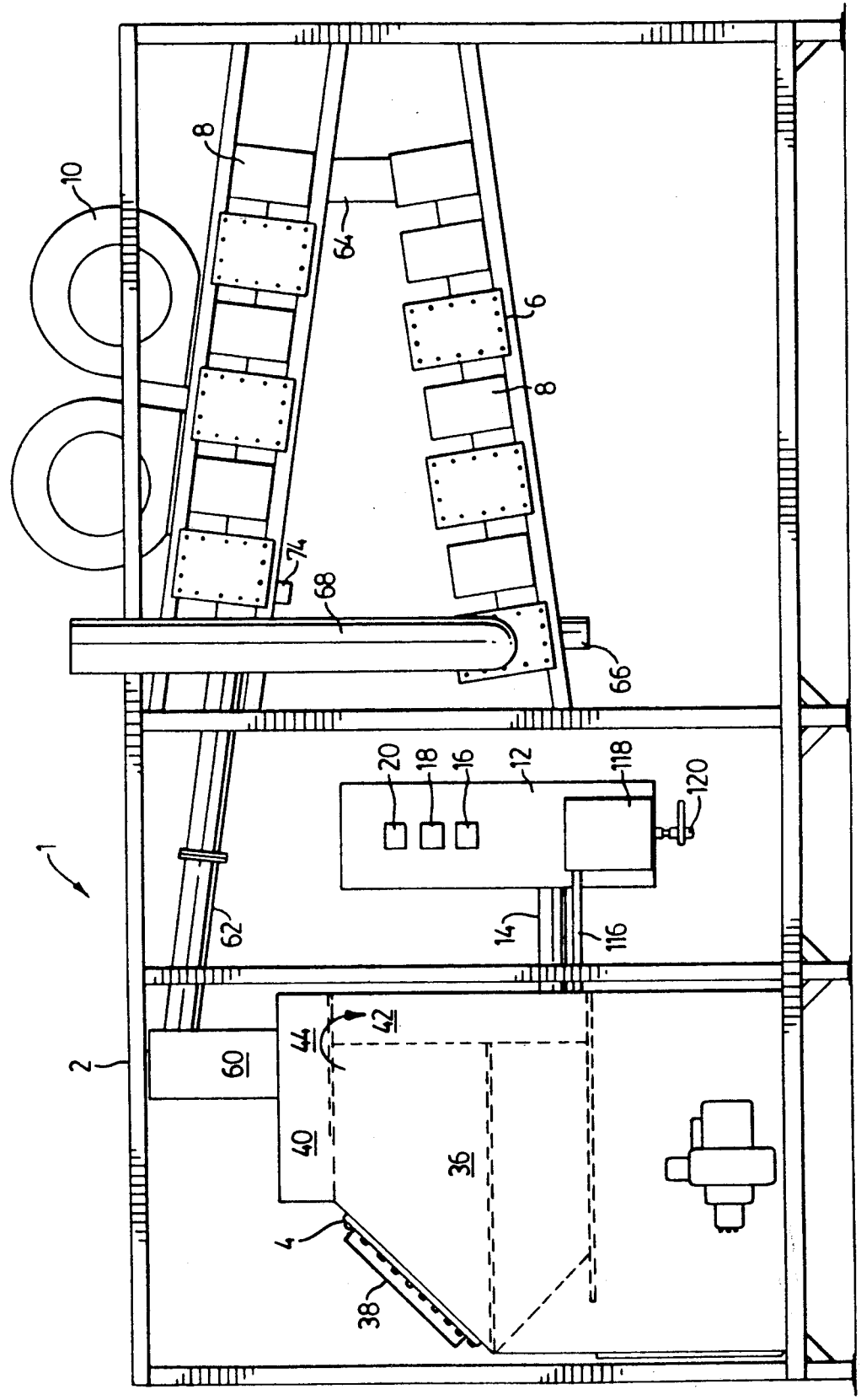
FIG. 1 is a front view of an apparatus in accordance with the present invention.

Referring to the Figures, the apparatus as a whole is denoted by the reference 1. The apparatus 1 has an external frame 2, supporting the various components of the apparatus.

As shown, at one end of the frame 2, there is a housing 4, defining a combustion and vaporization chambers. At the other side of the frame 2, there is a heat exchanger or condensing unit 6, which includes heat exchange ducts 8 and fans 10.

Mounted on one side of the housing 4 is a water flow control unit 12, connected by a pipe 14 to the housing. The housing 12 includes floats 16, 18, 20 detailed below, for controlling the flow rate of water.

Figure 2:
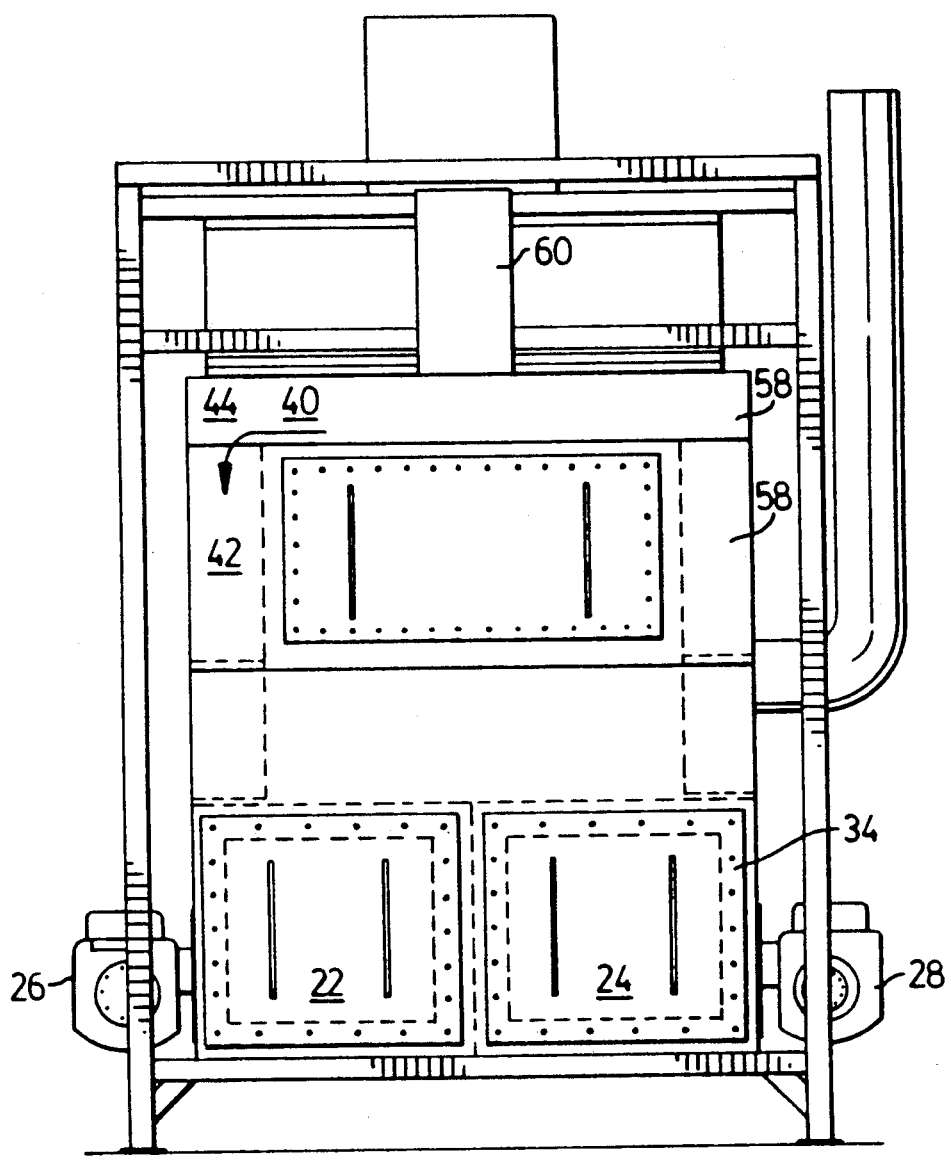
FIG. 2 is a left side view of the apparatus of FIG. 1.

As shown in FIG. 2, the housing defines first and second chambers 22, 24 for respective burners 26 and 28. These combustion chambers are shown in greater detail in FIG. 3.

As shown, each combustion chamber 22, 24 has a respective steel casing 30, within the housing 4. The casing 30 is lined with fire bricks or otherwise insulated as indicated at 32. Inspection doors 34 are provided at the left hand end, as best shown in FIG. 2.

Above the combustion chambers 22, 24, there is a vaporization vessel 36. The vessel 36 is connected to the inlet pipe 14, for supply of contaminated water. The vessel 36 has its own access door 38, which is inclined as chamber 40, which in turn continues into a duct 42 which extends down the side of the vaporization vessel 36 as viewed in FIG. 1, and also down the back of the vaporization vessel 36, as shown in FIG. 2. As indicated by the arrows 44 in FIGS. 1 and 2, this enables vaporized water, vaporized oil or other hydrocarbons, or any other vaporized material, to pass out of the vaporization vessel 36 down through the duct 42.

Figure 3:
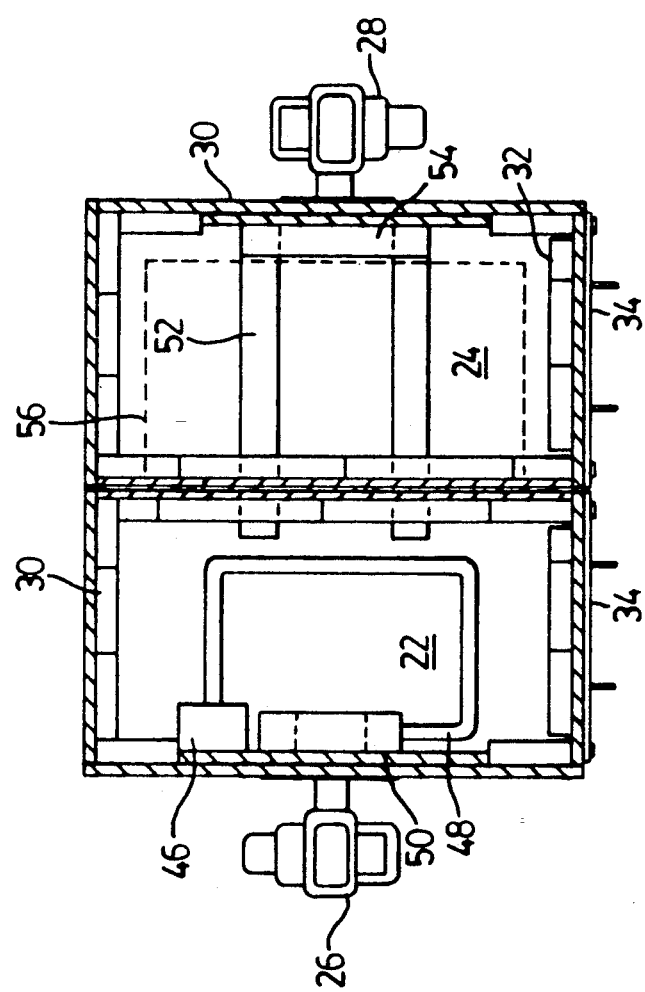
FIG. 3 is a horizontal section through the combustion chamber o apparatus of FIGS. 1 and 2.

The duct 42 is connected to an inlet 46 of a preheating pipe 48 (FIG. 3). The heating pipe 48 is formed of stainless steel and traverses the first combustion chamber 22 in a loop. Its outlet is connected to an injection port array 50 mounted around the inlet from the burner 26.

In use, the desired water level is maintained in the vaporization vessel 36. Water and other material are vaporized and flow down through the duct 42 to the inlet 46. This vapor is then passed through the pipe 48, to further heat it, and vaporize any droplets of moisture, etc. carried over in the flow. Simultaneously, the burner 26 is operating to heat the first combustion chamber 22. The port array 50 serves to inject the vapor into the flow of gases from the first burner 26, so that the water is vaporized, and oil, hydrocarbons, etc. are combusted.

A pair of 3" square stainless steel tubes 52 extend from the first combustion chamber 22 and serve as an exhaust outlet for the combustion products from the first combustion chamber 22. The stainless steel tubes 52 are connected to a second port array 54, which serves to inject the combustion products from the first chamber 22 into the gas flow from the second burner 28. Further combustion in the second combustion chamber 24 further ensures that any waste material or contaminants in the original water, which were not combusted in the first chamber 22, are subject to combustion in the second chamber 24.

The top of the first combustion chamber 22 is closed, and the second combustion chamber 24 is closed where it is covered by the vaporization vessel 36. At the front of the housing 4, and the two sides thereof, there is a U-shaped vent duct, indicated by the dotted line 56 in FIG. 3, and shown at 58 in FIG. 2. This vent duct 58 serves as a discharge outlet for the second combustion chamber 24, and is connected to a vapour or exhaust stack 60. The vapor stack 60 is in turn connected via a pipe 62 to the inlet of the first heat exchanger duct 8.

The heat exchanger duct 8 is arranged in two inclined layers. In each layer, there are a series of substantially parallel ducts which are formed from square tubes, and are connected together to form an elongated meandering or zig zag pathway for the vapor. Access doors are provided at alternate ends of the ducts. This arrangement of tubes has been found to provide an adequate surface area for heat transfer, whilst at the same time eliminating problems of clogging with more elaborate tube structures. At 64, a connection is made between the two layers of ducts. The outlet of the lowermost duct, there is a pipe 66 for the condensed water. A stack 68 is provided for any remaining vapor, which could comprise water vapor or other gaseous material.

Figure 4:
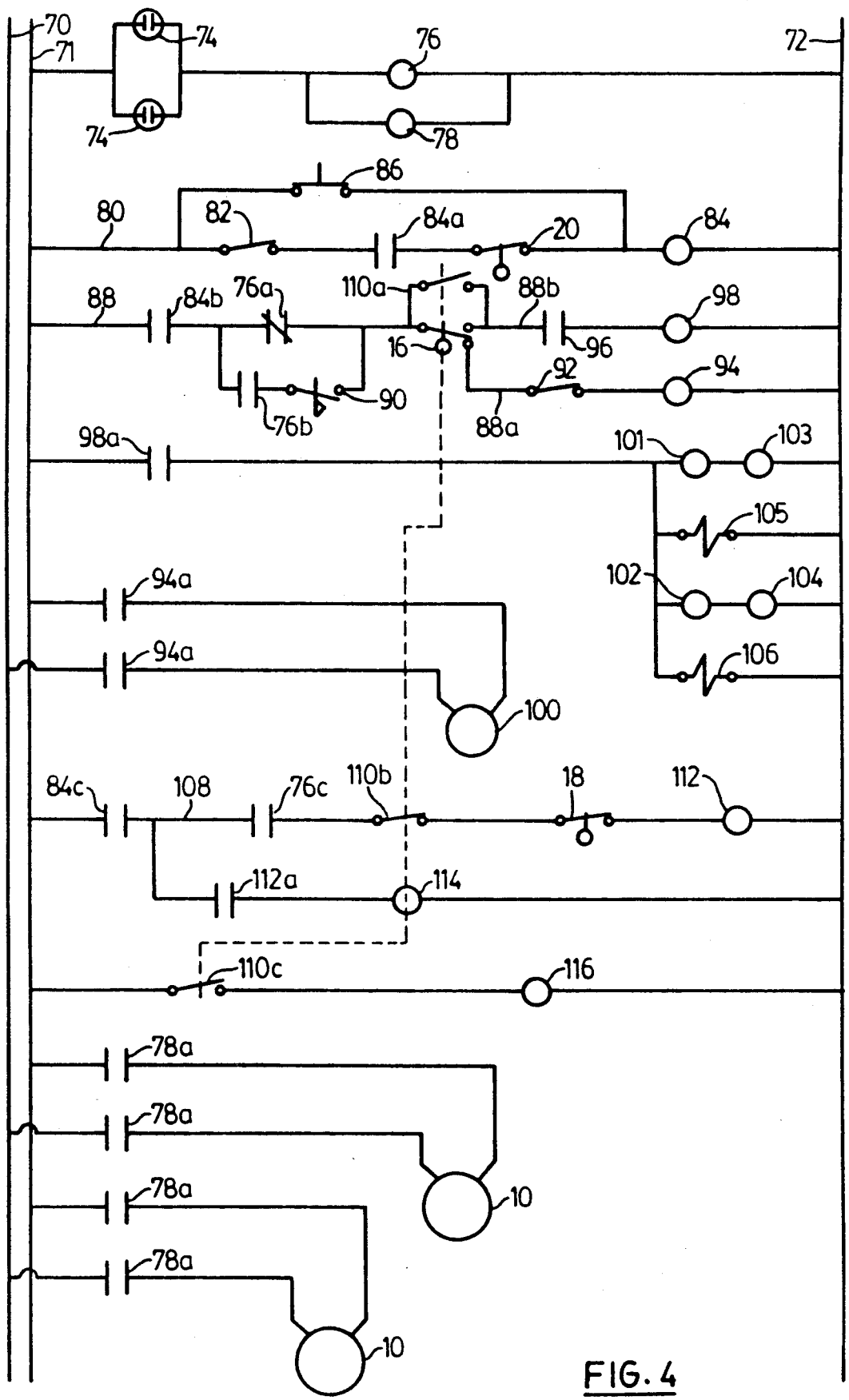
FIG. 4 an electrical schematic of the apparatus.

Reference is now made to FIG. 4, which shows the electrical schematic for the control circuitry.

In known manner, supply lines 70, 71 are provided, with a neutral line 72.

A pair of snap discs 74 are connected in parallel to the supply line 71 and also to a pair of control relays 76, 78, which in turn are connected to the line 72. The control relay 76 is for controlling a burner circuit, detailed below.

The control relay 78 closes contact paths 78a, to actuate the fans 10. The snap discs 74 are located on the heat exchange ducts 8, and when they sense a temperature in excess of 130° F., adjacent to the inlet to the ducts, then they close. As soon as one of the snap disc 74 closes, then the relay 78 is actuated, starting the fans 10.

A primary control line 80 includes a bake timer switch 82, which is normally closed. This is connected in turn to a pair of contacts 84A of a relay 84. The float switch 20 is a high level or safety float switch, and its contact pair is located as shown. A momentary start switch 86 is provided, parallel to the bake timer switch 82, contact pair 84A and the float switch 20. Thus, in use, actuation of the switch 86 actuates the relay 84, closing the contact pair 84A. This latches the relay 84 into an activated position, provided the bake timer switch 82 and the high level float switch 20 are also closed.

The relay 84 also closes contact pairs 84b in a burner and fill control line 88. The relay 76 controls a normally closed contact pair 76a and a normally open contact pair 76b. The contact pair 76b is in series with a sail switch 90. In effect, when the relay 76 is not activated, then control is through the contact pair 76a. When the relay 76 is activated, indicative of the fans being started up, then power or control is switched through the contact pair 76b. This requires the sail switch 90 to be closed for the line 88 to be closed. Sail switch 90 is located at a location for proving the air flow generated by the fans 10. The line 88 continues through the float switch 16, which is a low level float switch. In the absence of sufficient water level, the float switch 16 adopts the position shown, i.e. power is switched to the branch line 88a, with a second branch line 88b being isolated. In the branch line 88a, there is a fill pump lockout switch 92, connected in series with a further control relay 94.

Once a sufficient water level has been reached within the vaporization vessel 36, then the float switch 16 is activated, to isolate the line 88a, and instead supply power to the branch line 88b. This includes a temperature controller 96 and a further control relay 98. The temperature controller 96 is usually closed, but opens when a sufficient temperature is reached within the vaporization vessel 36 to prevent overheating.

The fill pump control relay 94 controls contact pairs 94a, which control power supply to a fill pump motor 100 which enables rapid filling of the vaporization vessel 36. Thus, once a sufficient level has been reached in the vessel 36, this fill pump 100 is turned off, and can be locked out by the switch 92, to prevent inadvertent operation thereof.

At this point, the relay 98 would be activated, closing the contact pair 98a. This enables power to be supplied to flame detectors or CAD cells 101, 102, which are connected in series with respective burner motors 103, 104. Power is also supplied to respective delayed oil valves 105, 106, for supplying combustion oil or fuel to the burners 24, 28.

The relay 84 controls a further contact pair 84c, in a line 108 for a second pump for maintaining the level in a vaporization vessel 36. This line 108 includes a contact pair 76c of the relay 76, for proving that the fans have been started.

A bake switch 110 includes a contact pair 110a for overriding the low level float switch 16, and a contact pair 110b in the line 108. Contact pair 110b is connected through the float switch 18, which is a maintained level float switch connected to a maintain level relay 112. This relay 112 in turn controls contact pairs 112A, for supplying power to a maintain level or second pump motor 114.

The bake switch 110 includes a further contact pair 110c for activating a bake timer 116.

Thus, in use, the bake switch 110 is initially in the position as shown, i.e. with the contact pairs 110a, 110c open, and contact pair 110b closed. At this time, the bake timer switch 82 would be closed. The momentary switch 86 is activated, latching the relay 84 on. This enables power to flow through the line 88 and low level float switch 16 to the control relay 94. At this time, the supply lockout switch 92 would be in the closed position shown. This activates the fill pump motor 100, which is operated until the vaporization vessel 36 is filled. After that point, the low level float switch 16 will switch the supply to the branch line 88b, and preferably the lockout switch 92 is actuated to lockout out the fill pump motor 100. The temperature control 196 will then activate the relay 98, and hence the motors 103, 104 etc. for the burners. The burners will then heat the vaporization vessel 36 and commence vaporization of water etc. therein. As detailed above, this water vapor, and other vapors, gases, etc. will be passed through the two combustion chambers and then to the heat exchange or condensing units 6.

When the temperature in the condensing unit 6 reaches 130° F., then at least one of the snap discs 74 will close, activating the relay 76, 78. Control of the burners will then be switched through the sail switch 90, to ensure than an adequate air flow is maintained. Simultaneously, the contact 76c will close, activating the maintain level pump motor 114. This will be controlled by the maintain level float 18, to maintain the level in the vaporization chamber 36 at the desired level. If at any time the high water level is exceeded, then the float switch 20 will cut off the relay 84, interrupting the burner control line 88. If the pump 114 does not maintain a sufficient level, as detected by the low level float switch 16, then this again will interrupt power to the control relay 98, effectively interrupting power supply to the burners.

The apparatus can then be operated for any desired length of time. During operation, samples of the contents of the vaporization vessel 36 can be taken off through a line 116 to a sample tank 118. This has an outlet valve 120. This enables a sample to be taken from the bottom of the vessel 36, to determine the concentration of any solids, residue, etc., which cannot be vaporized. When it is determined that a sufficiently high level of concentration of such material is present in the vessel 36, then a bake mode can be started.

In the bake mode, the bake switch 110 is operated, to close contacts 110a, 110c and open contact 110b. Opening the latter contact has the effect of interrupting power supply to the maintain level pump 114. Simultaneously, the supply lockout switch 92 should be open, to ensure that the fill pump motor 100 is not activated. This prevents any further water being supplied to the vessel 36.

Activating the bake timer 116 sets a time for the bake mode. At the end of this time, the switch 82 will be opened, determining operation of the apparatus.

Further, in the bake mode, the contacts 110A override the low level float switch 16, so that the burners can still operate, as controlled by temperature controller 96. If desired, for the bake mode, the temperature set by the temperature controller 96 can be raised. The vessel 36 is then heated continuously, to drive off remaining water vapor and higher temperatures will break down or vaporize other oils, hydrocarbons, that are present. When all material that can possibly be vaporized has been driven off, then the bake mode is ended, as set by the timer 116. At this time, the vessel 36 can be opened, and any residual solids and unvaporized material can be manually removed from the vessel 36. It is expected that the quantities of such solids should be relatively small, compared to the overall throughput of the apparatus 1, so that this cleaning operation should not be required too often.

In the apparatus described above, the entire heat for vaporizing the water is supplied by the burners 26, 28. Whilst some additional combustion material will be present in the water to be cleaned, this will not be sufficient to effect vaporization of all the water, and in any event will be a variable and unreliable source of combustible material.

In view of the present economics of disposing of oil-contaminated water, it is expected that operation of such apparatus should be economically feasible, even if fuel oil has to be supplied for such vaporization.

Nonetheless, to reduce the demand for fuel oil to vaporize the water, and improve the overall efficiency of the apparatus, a heat recovery system can be incorporated. Thus, the vapor and gaseous output from the stack 60 could be passed through a counterflow heat exchanger. On the other side of the heat exchanger, incoming water could flow, so as to absorb heat from the condensing vapor. It would only be necessary for the burners 26, 28 to provide sufficient heat input, to make up for, in effect, inefficiencies in the heat exchanger.

As an alternative, for some uses, it may not be desirable to condense or recover the heat from the vapor from the stack 60. It is anticipated that it should be possible to simply discharge this vapor into the atmosphere, since it essentially comprises clean water. A further alternative would be to recover the heat in some unrelated process or industry. Thus, it could be used in any industry or activity where relatively large quantities of a low temperature heating fluid are required.

It could be noted that even if the original contaminated water contained oil-based contaminants at the level of thousands of ppm, it has been found that the apparatus of the present invention could reduce this to better than 10 ppm. This is well within typical regulatory requirements of 15 ppm for simple disposal of previously contaminated water. Consequently, any recovered, condensed water can simply be discharged into water courses. Oil-based contaminants, hydrocarbons, etc. are consumed in the combustion chambers to produce water and gases such as carbon dioxide which may safely be vented to the atmosphere.

Whilst FIG. 4 shows an electrical schematic, it is preferred for the electrical control to be effected through a programmable logic controller. The accompanying Appendix A shows the programming input for a programmable logic controller, for effecting functions, substantially similar to that shown in FIG. 4, for an Omron C28F.

I claim:

1. An apparatus, for removing contaminants from water, the apparatus comprising:
   a chamber including means for supplying combustion air to the chamber and an exhaust outlet;
   heating means comprising a burner having air and fuel supply inlets, located within the chamber to heat the interior of the chamber to a temperature sufficient to vaporize water and cause combustion of any contaminants present;
   an evaporation vessel located above the chamber, which evaporation vessel includes an inlet for contaminated water, and is arranged to discharge water vapor and vaporized contaminants into the combustion chamber, and means for supplying contaminated water to the inlet of the evaporation vessel.

2. An apparatus as claimed in claim 1, wherein the upper end of the evaporation vessel is open, a communication duct is provided connected to the upper end of the evaporation vessel, and a pre-heater pipe is connected to the other end of the communication duct, which preheater pipe extends through the combustion chamber, whereby vaporised water and contaminants pass through the communication duct and the pre-heater pipe before discharging into the combustion chamber.

3. An apparatus as claimed in claim 2, wherein the pre-heater pipe is connected to inject on port means located adjacent to the burner, for injecting water vapor and any vaporized contaminants into the gas flow form the burner.

4. An apparatus as claimed in claim 3, wherein a second combustion chamber located adjacent the first combustion chamber below the evaporation vessel, which second combustion chamber includes a second burner having respective inlets for fuel and air, and wherein the exhaust outlet of the first combustion chamber is connected to the second combustion chamber, whereby the combustion products from the first combustion chamber are subjected to further combustion in the second combustion chamber, the second combustion chamber having a discharge outlet.

5. An apparatus as claimed in claim 4, wherein the first and second combustion chambers are located side by side, with a common dividing wall, and wherein the exhaust outlet form the first combustion chamber comprises at least one tube which extends through that common dividing wall, and across the second combustion chamber.

6. An apparatus as claimed in claim 5, wherein each tube within the second combustion chamber is connected to a second injection port means, for injecting the combustion products form the first combustion chamber into the flow of gases from the second burner.

7. An apparatus as claimed in claim 6, wherein the discharge outlet of the second combustion chamber is connected to a heat exchanger, in which heat exchanger the combustion products are cooled and the water vapor is condensed.

8. An apparatus as claimed in claim 1 or 6, which includes a float tank having an inlet for a supply of contaminate water and an outlet connected to the evaporation vessel, the float tank having at least one float for controlling the level therein and thereby controlling the water level within the evaporation vessel.

9. An apparatus as claimed in claim 1, which includes a second combustion chamber located adjacent the first combustion chamber below the evaporation vessel, which second combustion chamber includes a second burner having respective supply inlets for fuel and air, and wherein the first exhaust outlet is connected to the second combustion chamber, whereby the combustion products form the first combustion chamber are subjected to further combustion in the second combustion chamber, the second combustion chamber having a discharge outlet.

10. An apparatus as claimed in claim 9, which includes a heat exchanger connected to the discharge outlet of the second combustion chamber, in which heat exchanger the combustion products are cooled and any water vapor is condensed.

11. An apparatus as claimed in claim 10 or 7, wherein the heat exchanger has an outlet for condensed water and an exhaust stack for gaseous combustion products.

12. An apparatus as claimed in claim 10, which includes a float tank having an inlet for a supply of contaminated water and an outlet connected to the evaporation vessel, the float tank having at least one float for controlling the level therein and thereby controlling the water level within the evaporation vessel.

13. An apparatus as claimed in claim 12, which includes fans for cooling the heat exchanger, and a burner control circuit, which includes sail switch means for interrupting the burner circuit in the absence of sufficient air flow through the heat exchanger, and float switch means for interrupting the burner circuit if the level within the float tank goes beyond upper and lower limits, interruption of the burner circuit causing interruption of the air and fuel supply to each burner.

14. An apparatus as claimed in claim 13, which includes a bake mode circuit, including a bake mode switch for overriding the float switch means to permit operation of the burners in the absence of sufficient water level within the evaporation vessel, and for setting a bake time, at the end of which time the burner circuit is interrupted.

15. An apparatus as claimed in claim 14, wherein the float tank is supplied with water by pump means, the pump means being actuated by the float means, wherein the bake mode switch includes means for interrupting the power supply to the pumps, to interrupt water supply during the bake mode.

16. A method of removing contaminants from water, the method comprising:
   (1) heating water to evaporate the water and vaporise any contaminants therein;
   (2) supplying fuel and combustion air to a chamber;
   (3) heating the chamber to a temperature sufficient to vaporize water and cause combustion of any contaminants therein by means of a burner, supplied with the fuel and combustion air;
   (4) supplying the vaporised water and contaminants to the combustion chamber whereby any residual water is vaporised and any contaminants are combusted, the water vapor and combustion products being exhausted through an exhaust outlet.

17. A method as claimed in claim 16, wherein, following step (4), the water vapor and the combustion products are supplied to a second combustion chamber in which further combustion takes place to ensure full combustion of any contaminants, the second combustion chamber being heated by a second burner having respective supply inputs for fuel and air.

18. A method as claimed in claim 16 or 21, wherein the water vapor from the exhaust outlet is condensed and recovered, and the gaseous combustion products are vented to the atmosphere.

19. A method as claimed in claim 16 or 21, wherein after operation for a predetermined length of time, supply of water to the combustion-chamber is interrupted and the chamber is heated to a higher temperature for a bake mode, to vaporize or drive off further contaminants for combustion, and wherein following the bake mode any residual contaminants are removed from the combustion chamber.

* * * * *